(12) United States Patent
Karjalainen et al.

(10) Patent No.: US 12,253,616 B2
(45) Date of Patent: Mar. 18, 2025

(54) SPATIAL DOMAIN MEASUREMENTS FOR BEAM BASED POSITIONING

(71) Applicant: NOKIA TECHNOLOGIES OY, Espoo (FI)

(72) Inventors: Juha Pekka Karjalainen, Oulu (FI); Timo Koskela, Oulu (FI); Sami-Jukka Hakola, Kempele (FI); Italo Atzeni, Oulu (FI); Carlos Morais De Lima, Oulu (FI); Dileep Kumar, Oulu (FI); Antti Tölli, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 368 days.

(21) Appl. No.: 17/912,268

(22) PCT Filed: Mar. 20, 2020

(86) PCT No.: PCT/EP2020/057779
§ 371 (c)(1),
(2) Date: Sep. 16, 2022

(87) PCT Pub. No.: WO2021/185454
PCT Pub. Date: Sep. 23, 2021

(65) Prior Publication Data
US 2023/0147613 A1      May 11, 2023

(51) Int. Cl.
*G01S 5/02*     (2010.01)
*H04W 64/00*    (2009.01)

(52) U.S. Cl.
CPC .......... *G01S 5/0268* (2013.01); *G01S 5/0236* (2013.01); *H04W 64/00* (2013.01); *H04W 64/003* (2013.01)

(58) Field of Classification Search
CPC ............................. H04W 64/00; H04W 64/003
See application file for complete search history.

(56) References Cited

U.S. PATENT DOCUMENTS

| | | | |
|---|---|---|---|
| 2014/0162704 A1 | 6/2014 | Choi et al. | |
| 2015/0011236 A1 | 1/2015 | Kazmi et al. | |
| 2017/0328979 A1* | 11/2017 | Franke | G01S 5/12 |
| 2019/0182665 A1* | 6/2019 | Edge | H04W 64/00 |
| 2019/0372688 A1 | 12/2019 | Sadiq et al. | |
| 2019/0373594 A1* | 12/2019 | Sadiq | H04W 64/00 |
| 2020/0275236 A1* | 8/2020 | Gangakhedkar | H04W 64/00 |
| 2021/0328747 A1* | 10/2021 | Da | H04W 64/00 |

OTHER PUBLICATIONS

M.N.O. Sadiku, Elements of Electromagnetics, 3rd Edition, Oxford University Press, p. 28-52 (Year: 2000).*

(Continued)

*Primary Examiner* — Bernarr E Gregory
*Assistant Examiner* — Fred H Mull
(74) *Attorney, Agent, or Firm* — Robert P. Michal, Esq.; Carter, DeLuca & Farrell LLP

(57) ABSTRACT

Various example embodiments relate to positioning of a target node. A positioning report may comprise positioning assistance measurements from the target node and at least one anchor node, wherein the positioning assistance measurements are associated with angular differences between a pair of uplink and/or downlink transmission and/or reception beam directions. Apparatuses, methods, and computer programs are disclosed.

1 Claim, 11 Drawing Sheets

(56) References Cited

OTHER PUBLICATIONS

A. Negi, Analysis of Relay-based Cellular Systems, Dissertation, Portland State University (Year: 2007).*
International Search Report & Written Opinion dated Oct. 26, 2020 corresponding to International Patent Application No. PCT/EP2020/057779.
Ericsson, "UE and gNB measurements for NR positioning," 3GPP Draft; R1-1913137, 3GPP TSG RAN WG1 #99, Reno, Nevada, Oct. 18-22, 2019, Nov. 8, 2019, XP051820325.

* cited by examiner

SPATIAL DOMAIN MEASUREMENTS FOR BEAM BASED POSITIONING

TECHNICAL FIELD

The present application generally relates to information technology. In particular, some example embodiments of the present application relate to positioning of user equipment using spatial domain measurements.

BACKGROUND

In 3GPP NR (new radio) an extended version of the LTE Positioning Protocol (LPP) or a corresponding NR protocol between a user equipment (UE) and a location management function (LMF) may be utilized to support positioning of the UE by the radio network. In some situations, a direct communication link between the UE and LPP or a corresponding new radio (NR) protocol may not be available. For example, in the case of a radio link failure between the UE and its serving base station the signaling exchange through the LPP between LMF and UE is interrupted, and real-time positioning based on new positioning measurements may not be possible anymore. For example, in case the UE is a vehicle, such a situation may occur when the vehicle enters a tunnel or any other area with bad coverage. Also, achievable accuracy may be very bad if the signals are reflected at buildings in a dense urban environment. On the other hand, for applications like autonomous driving, industrial internet of things, or vulnerable road user protection, ubiquitous real-time positioning without any service interruption may be desired.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments enable high accuracy positioning of UE. The example embodiments may enable positioning the UEs in presence of non-line-of-sight radio propagation environments. This may be achieved by the features of the independent claims. Further implementation forms are provided in the dependent claims, the description, and the drawings.

According to a first aspect, an apparatus comprises at least one processor; and at least one memory including computer program code; the at least one memory and the computer program code configured to, with the at least one processor, cause the apparatus at least to: receive, at a target network node, a positioning measurement configuration from a network node; connect to a plurality of anchor network nodes with a pair of uplink and/or downlink transmission and/or reception beams; compute at least one positioning assistance measurement of the target network node comprising an angular difference between the pair of uplink and/or downlink transmission and/or reception beam directions based on the positioning measurement configuration; and determine a positioning report comprising the at least one positioning assistance measurement of the target network node.

According to a second aspect, a method comprises receiving, at a target network node, a positioning measurement configuration from a network node; connecting to a plurality of anchor network nodes with a pair of uplink and/or downlink transmission and/or reception beams; computing at least one positioning assistance measurement of the target network node comprising an angular difference between the pair of uplink and/or downlink transmission and/or reception beam directions based on the positioning measurement configuration; and determining a positioning report comprising the at least one positioning assistance measurement of the target network node.

According to a third aspect, a computer program is configured, when executed by a processor, to cause an apparatus at least to: receive, at a target network node, a positioning measurement configuration from a network node; connect to a plurality of anchor network nodes with a pair of uplink and/or downlink transmission and/or reception beams; compute at least one positioning assistance measurement of the target network node comprising an angular difference between the pair of uplink and/or downlink transmission and/or reception beam directions based on the positioning measurement configuration; and determine a positioning report comprising the at least one positioning assistance measurement of the target network node.

According to a fourth aspect, an apparatus comprises means for receiving, at a target network node, a positioning measurement configuration from a network node; means for connecting to a plurality of anchor network nodes with a pair of uplink and/or downlink transmission and/or reception beams; means for computing at least one positioning assistance measurement of the target network node comprising an angular difference between the pair of uplink and/or downlink transmission and/or reception beam directions based on the positioning measurement configuration; and means for determining a positioning report comprising the at least one positioning assistance measurement of the target network node.

According to a fifth aspect, an apparatus comprises at least one processor; and at least one memory including computer program code; the at least one memory and the computer program code configured to, with the at least one processor, cause the apparatus at least to: connect to a network node and a target node with a pair of uplink and/or downlink transmission and/or reception beams; receive, at an anchor node, a positioning measurement configuration from the network node; compute at least one positioning assistance measurement of the anchor node comprising an angular difference between the pair of uplink and/or downlink transmission and/or reception beam directions based on the positioning measurement configuration; receive a positioning report from the target node comprising a positioning assistance measurement associated with the target node and a plurality of anchor nodes connected with the target node; and determine a second positioning report comprising the positioning assistance measurements of the anchor node and the target node.

According to a sixth aspect, a method comprises connecting to a network node and a target node with a pair of uplink and/or downlink transmission and/or reception beams; receiving, at an anchor node, a positioning measurement configuration from the network node; computing at least one positioning assistance measurement of the anchor node comprising an angular difference between the pair of uplink and/or downlink transmission and/or reception beam directions based on the positioning measurement configuration; receiving a positioning report from the target node comprising a positioning assistance measurement associated with the target node and a plurality of anchor nodes connected with the target node; and determining a second positioning report comprising the positioning assistance measurements of the anchor node and the target node.

According to a seventh aspect, a computer program is configured, when executed by a processor, to cause an apparatus at least to: connect to a network node and a target node with a pair of uplink and/or downlink transmission and/or reception beams; receive, at an anchor node, a positioning measurement configuration from the network node; compute at least one positioning assistance measurement of the anchor node comprising an angular difference between the pair of uplink and/or downlink transmission and/or reception beam directions based on the positioning measurement configuration; receive a positioning report from the target node comprising a positioning assistance measurement associated with the target node and a plurality of anchor nodes connected with the target node; and determine a second positioning report comprising the positioning assistance measurements of the anchor node and the target node.

According to an eighth aspect, an apparatus comprises means for connecting to a network node and a target node with a pair of uplink and/or downlink transmission and/or reception beams; means for receiving, at an anchor node, a positioning measurement configuration from the network node; means for computing at least one positioning assistance measurement of the anchor node comprising an angular difference between the pair of uplink and/or downlink transmission and/or reception beam directions based on the positioning measurement configuration; means for receiving a positioning report from the target node comprising a positioning assistance measurement associated with the target node and a plurality of anchor nodes connected with the target node; and means for determining a second positioning report comprising the positioning assistance measurements of the anchor node and the target node.

According to a ninth aspect, there is provided an apparatus comprising at least one processor; and at least one memory including computer program code; the at least one memory and the computer code configured to, with the at least one processor, cause the apparatus at least to: establish a plurality of connections to a target node via a plurality of anchor nodes; determine, by a network node, a positioning measurement configuration of positioning assistance measurements for the target node and the plurality of anchor nodes; and dispatch the positioning measurement configuration to at least one of the target node and/or to the plurality of anchor nodes.

According to a tenth aspect, there is provided a method comprising establishing a plurality of connections to a target node via a plurality of anchor nodes; determining, by a network node, a positioning measurement configuration of positioning assistance measurements for the target node and the plurality of anchor nodes; and dispatching the positioning measurement configuration to at least one of the target node and/or to the plurality of anchor nodes.

According to an eleventh aspect, a computer program is configured, when executed by a processor, to cause an apparatus at least to: establish a plurality of connections to a target node via a plurality of anchor nodes; determine, by a network node, a positioning measurement configuration of positioning assistance measurements for the target node and the plurality of anchor nodes; and dispatch the positioning measurement configuration to at least one of the target node and/or to the plurality of anchor nodes.

According to a twelfth aspect, an apparatus comprises means for establishing a plurality of connections to a target node via a plurality of anchor nodes; determining, by a network node, a positioning measurement configuration of positioning assistance measurements for the target node and the plurality of anchor nodes; and dispatching the positioning measurement configuration to at least one of the target node and/or to the plurality of anchor nodes.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to explain the example embodiments. In the drawings.

Like references are used to designate like parts in the accompanying drawings.

DETAILED DESCRIPTION

Figure 1:
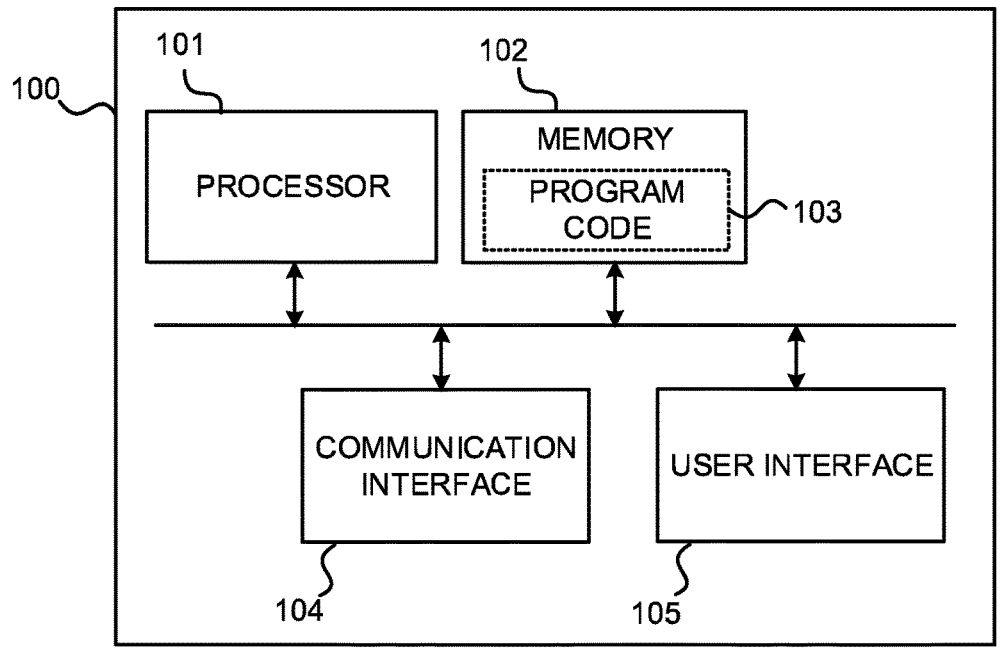
FIG. 1 illustrates an example of an apparatus configured to practice one or more example embodiments.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of steps for constructing and operating the example. However, the same or equivalent functions and sequences may be accomplished by different examples.

Positioning of a UE may be provided by utilizing an anchor node assisted beam-based procedure using, for example, an anchor angle difference (AAD) and time-of-arrival (TOA) measurements for localizing out-of-coverage target nodes. The anchor node may be, for example, a UE, a sidelink UE, an integrated access and backhaul (IAB) node, a network node, or the like. Also, the target network node may be, for example, a UE, a sidelink UE, an integrated access and backhaul (IAB) node, or the like. The anchor and target nodes may be assumed to communicate through non-line-of-sight (NLoS) radio channel propagation. Additionally, there may exist scatterers that are associated with each TX-RX (transmission-reception) beam-pair per link between the anchor and target nodes. The measurement results may be reported to a Next Generation NodeB (gNB) that in its turn provides respective positioning reports to a location server via higher layer signaling. Based on the positioning reports, the location server may utilize the ToA and AAD measurements to estimate the position of the target node.

However, a wide uncertainty region related to the accuracy of positioning may result from using the combination of AAD and TOA, which may lead to a failure when estimating the target node position. The combination of ToA and AAD may not properly take into account NLoS components in the radio channel between the anchor and target nodes and thus positioning performance in terms of accuracy may be poor in such propagation conditions. Therefore, positioning based on only time measurements and AAD may be unfeasible in deployment scenarios wherein the radio channel is characterized by NLoS propagation.

Example embodiments provide new positioning measurement techniques and reporting mechanisms for both anchor and target nodes that may enable high-accuracy positioning also in NLoS radio propagation environments. The example embodiments may further provide enhanced positioning for utilization by applications requiring high positioning accuracy, for example, industrial IoT (internet of things), factory of the future, collaboration robots, V2X (vehicle-to-anything), etc.

According to an example embodiment, a target node based angular difference (TAD) measurement and a related positioning reporting enhancements for beam-based positioning are provided to enhance positioning accuracy of target and/or anchor nodes. By leveraging the combination of the TAD, AAD, and time measurement reports for a network-based or UE-based positioning, the positioning accuracy of the target and/or anchor UE in the presence of NLoS radio channels may be enhanced. To enable more flexible positioning measurements for UEs/network nodes with different capabilities in various deployment scenarios, further enhancements for TAD and AAD measurements are disclosed such as a possibility for obtaining the measurements in a local and a global coordinate system. Further, angle difference measurements between different combinations of transmission (TX) and reception (RX) beams associated with downlink (DL) and uplink (UL) resources are provided.

According to example embodiments, positioning reports comprising both TAD and AAD measurements may be combined and used in conjunction with time difference measurements and/or round-trip-time measurements and/or carrier phase measurements and/or angle of arrival measurements and/or angle of departure measurements, and/or reference signal received power measurements at the network, for example at a localization server, or at the UE side. This may enable accurate network or UE based positioning for a target UE and/or anchor UE in NLoS scenarios. The joint use of AAD and TAD as well time difference measurements and/or round-trip-time measurements and/or carrier phase measurements and/or angle of arrival measurements and/or angle of departure measurements, and/or reference signal received power measurements may allow the network or the UE to emulate transmitted signal propagation over different channel obstacles, such as clusters, reflections or scatterers, in the spatial domain associated with measured TX-RX beam pair per link. The TAD measurements may enable to emulate the spatial spread of the transmission signal in the vicinity of the target UE resulting in enhanced positioning accuracy in NLoS scenarios.

To enable the utilization of TAD measurements for UE or network-based positioning, new positioning information reporting may be defined using the TAD and AAD measurements from the target and anchor nodes involved. The AAD and TAD measurements may be provided in one or more positioning reports for UE or network node to perform the positioning of a certain node.

FIG. 1 illustrates an example of an apparatus 100 configured to practice one or more example embodiments. The apparatus may be configured to at least assist in localizing a user equipment (UE). The apparatus 100 may be, for example, a network node, a target node or an anchor node. The target node and the anchor node may be, for example, a UE.

Apparatus 100 may comprise at least one processor 101. The at least one processor 101 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 100 may further comprise at least one memory 102. The memory 102 may be configured to store, for example, computer program code 103 or the like, for example operating system software and application software. The memory 102 may comprise one or more volatile memory devices, one or more non-volatile memory devices, and/or a combination thereof. For example, the memory 102 may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 100 may further comprise communication interface 104 configured to enable apparatus 100 to transmit and/or receive information, to/from other apparatuses. The communication interface may be configured to provide at least one wireless radio connection, such as for example a 3GPP mobile broadband connection (e.g. 3G, 4G, 5G). However, the communication interface 104 may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 104 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The apparatus 100 may further comprise a user interface 105 comprising an input device and/or an output device. The input device may take various forms such a keyboard, a touch screen, or one or more embedded control buttons. The output device may for example comprise a display, a speaker, a vibration motor, or the like.

When the apparatus 100 is configured to implement some functionality, some component and/or components of the apparatus 100, such as for example the at least one processor and/or the memory, may be configured to implement this functionality. Furthermore, when the at least one processor 101 is configured to implement some functionality, this functionality may be implemented using program code 103 comprised, for example, in the memory 102.

The functionality described herein may be performed, at least in part, by one or more computer program product components such as software components. According to an embodiment, the apparatus 100 comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus 100 comprises means for performing at least one method described herein. In one example, the means comprises the at least one processor 101, the at least one memory 102 including program code 103 configured to, when executed by the at least one processor 101, cause the apparatus 100 to perform the method.

Apparatus 100 may comprise for example a computing device such as for example a server device, a client device, a mobile phone, a tablet computer, a laptop, or the like. In one example, the apparatus 100 may comprise a vehicle. Although the apparatus 100 is illustrated as a single device it is appreciated that, wherever applicable, functions of apparatus 100 may be distributed to a plurality of devices.

Figure 2:
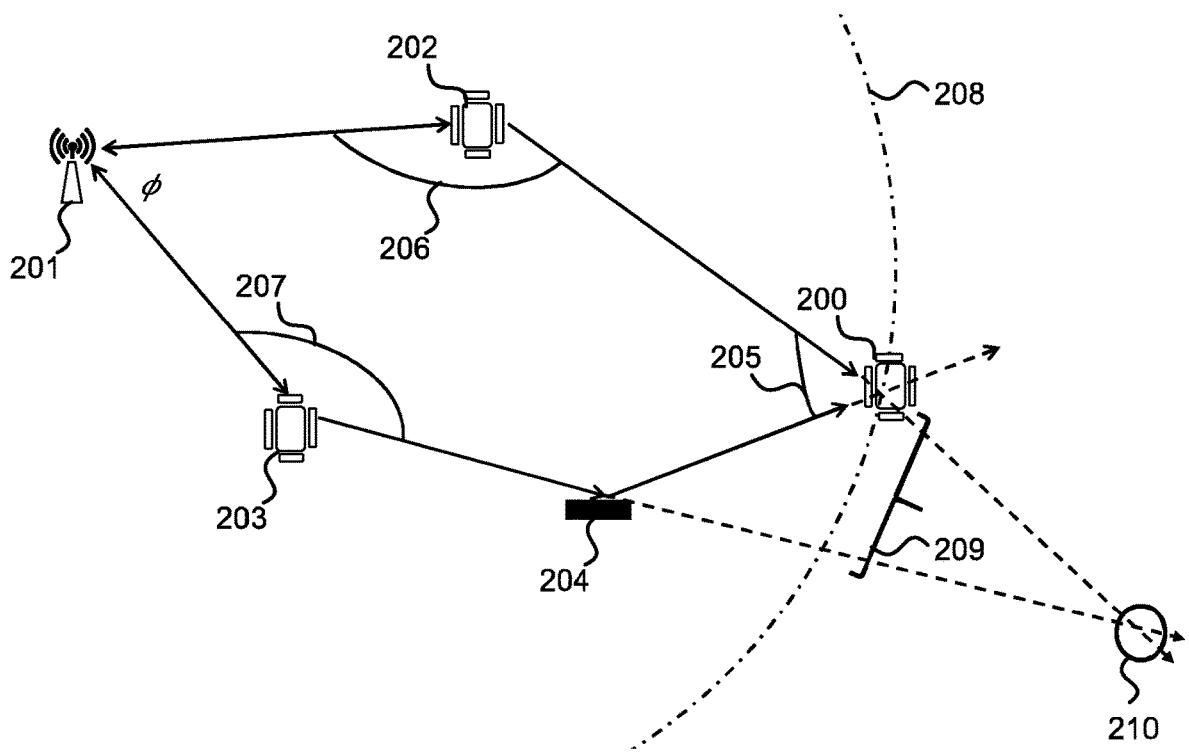
FIG. 2 illustrates an example of beam-domain based processing of positioning information for localizing a user equipment when the user equipment is not directly reachable by a network node according to an example embodiment.

FIG. 2 illustrates an example of beam-domain based processing of positioning information for localizing a UE 200 in a network when the UE 200 is not directly reachable by a network node 201 according to an example embodiment. The network may comprise the network node 201, a target node 200, and a plurality of anchor nodes 202, 203. The target node 200 and the plurality of anchor nodes 202, 203 may be also referred to as a user node, a client node, a user equipment (UE), a network node, an LAB node, a sidelink node, a transmission-Reception Point (TRP), which may be a set of geographically co-located antennas (e.g. antenna array (with one or more antenna elements)) supporting TP and/or RP functionality, a V2X (vehicle-to-everything) node or a V2V (vehicle-to-vehicle) node. The target and anchor nodes 200, 202, 203 may communicate with one or more base stations 201 over wireless radio channel(s). Base stations may be also called network nodes 201. In general, a network node may comprise any suitable radio access point. For example, UE 200, 202, 203 may be configured to communicate with the network node 201, such as a 5G node, gNB, and/or a 4G node, eNB. The target node 200 may have a non-line-of-sight path with an unknown position of a scatterer 204 to the first anchor node 203. The second anchor node may have a line-of-sight path to the target node 200.

If only a time difference measurement, such as a time-of-flight measurement of a signal between the target node and at least one of the anchor nodes is used, there is an uncertainty of the position of the UE 200. The time difference measurements related to propagation of signals may be used to estimate distance between the target UE and the anchor node, as illustrated with an arch 208 of a circle around the corresponding anchor node. The time difference measurements may only enable estimating the location of the UE 200 within the circle where the estimated distance corresponds to the radius of the circle.

When anchor node based angular difference (AAD) measurements 206, 207 are used together with a transmission/reception beam angle $\phi$ of the network node 201, the estimated position of the UE 200 may be within a segment 209. Hence, there is still uncertainty about the true location of the UE 200.

When both the time difference measurements and the AAD measurements are used, the estimated position of the UE 200 may be, for example, within a circle 210. The estimated location may not be accurate, because it may not be possible to take into account the effect of the scatterer 204 using only the AAD and time difference measurements.

However, when also target node based angular difference (TAD) measurements are obtained from the target node 200, the target node 200 may be localized accurately also in the non-line-of-sight scenarios. In an embodiment, a geometry of the network comprising the network node, the target node and the plurality of anchor nodes may be reconstructed based on the AAD and TAD measurements and the time difference measurements to localize the target node 200. With the additional TAD measurements, the anchor nodes 202, 203 and the network node 201 may know the direction of projections caused by any obstacles, such as the scatterer 204, between the target node 200 and the network/anchor nodes. Hence, positioning accuracy of the target node 200 may be increased. In addition, or alternatively, the reconstructed geometry of the network may be used to estimate positions of other nodes, such as the anchor nodes 202, 203.

Figure 3:
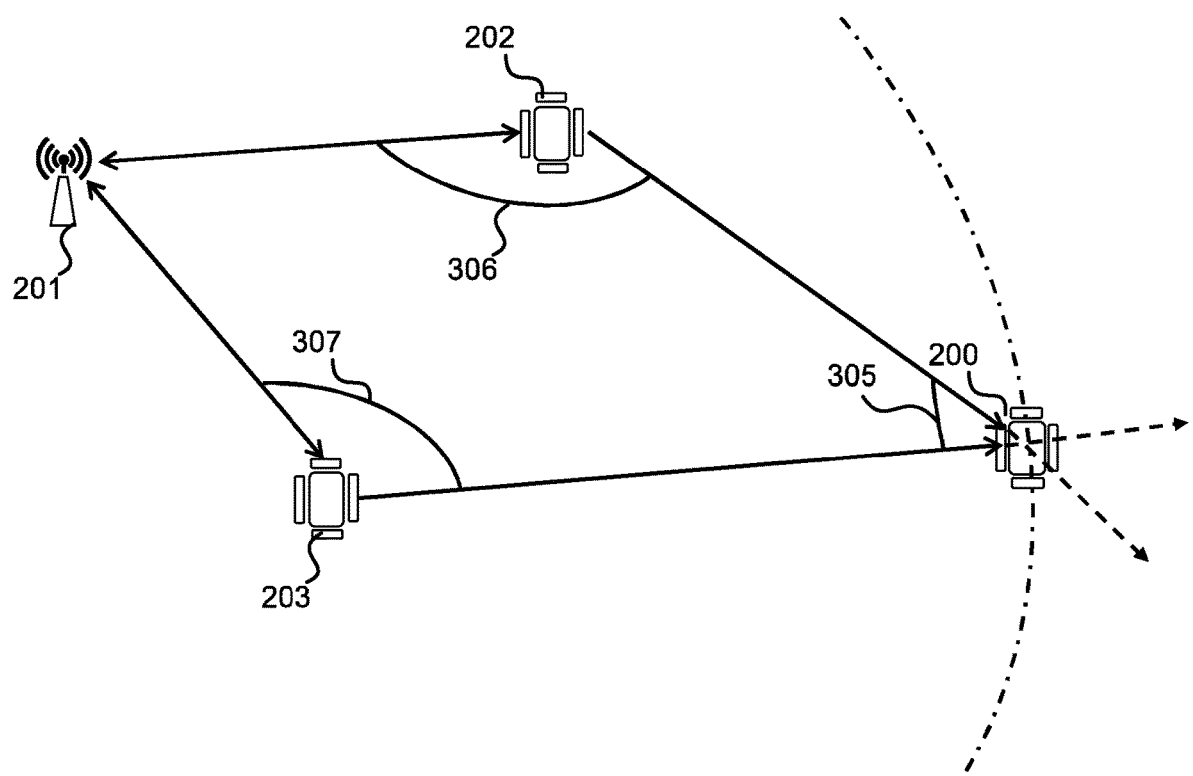
FIG. 3 illustrates an example of beam-domain based processing of positioning information for localizing a user equipment when the user equipment is directly reachable by a network node according to an example embodiment.

FIG. 3 illustrates an example of beam-domain based processing of positioning information for localizing the UE 200 when the UE 200 is directly reachable by the network node 201 according to an example embodiment. The network is like the network in FIG. 2, but there is line-of-sight between the network node 201, the UE 200, and the anchor nodes 202, 203. Even when there are no scatterers, the TAD measurements 305 may be used together with the AAD measurements 306, 307 to improve the positioning accuracy as described above, for example, in case of noisy measurements.

Figure 4:
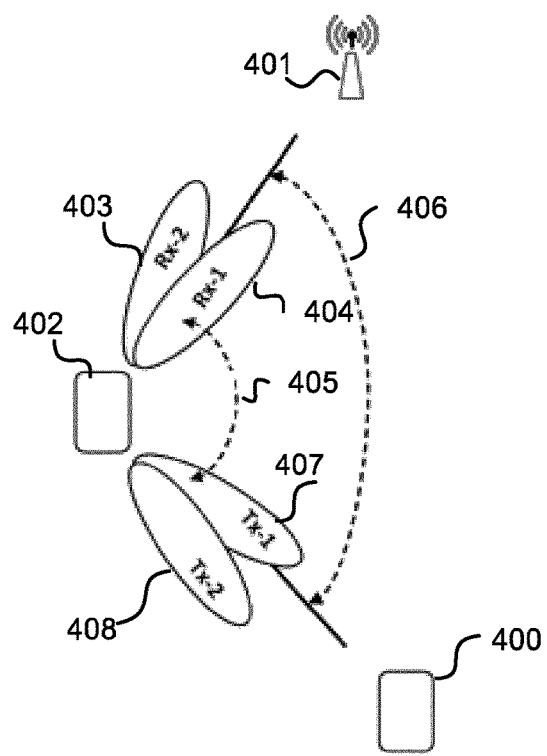
FIG. 4 illustrates an example of obtaining a weighted difference between transmission and reception beam angles according to an example embodiment.

FIG. 4 illustrates an example of obtaining a weighted difference between transmission 407, 408 and reception 403, 404 beam angles according to an example embodiment. The angular differences in spatial domain may be computed by the anchor node 402 based on combining a weighted angle of departure and/or reception of multiple transmission or reception beams 407, 408 to and/or from a network node 401 and a weighted angle of arrival of multiple reception beams 403, 404 from the target node 400. The weighted angles of arrival and/or departure may be weighted with the corresponding quality of reference signals, e.g. layer one reference signal reception power (L1-RSRP) and/or spatial weighting pattern (e.g. weights associated with different reported beam pairs) configured by the network. In an embodiment, the target node 400 may be configured to compute the angular differences of the target node 400 based on the weighted angular differences of multiple transmission and/or reception beam directions weighted with the corresponding reference signals. The weighted angular differences may enable accounting inherent uncertainty in the transmission and/or reception beam directions.

Figure 5:
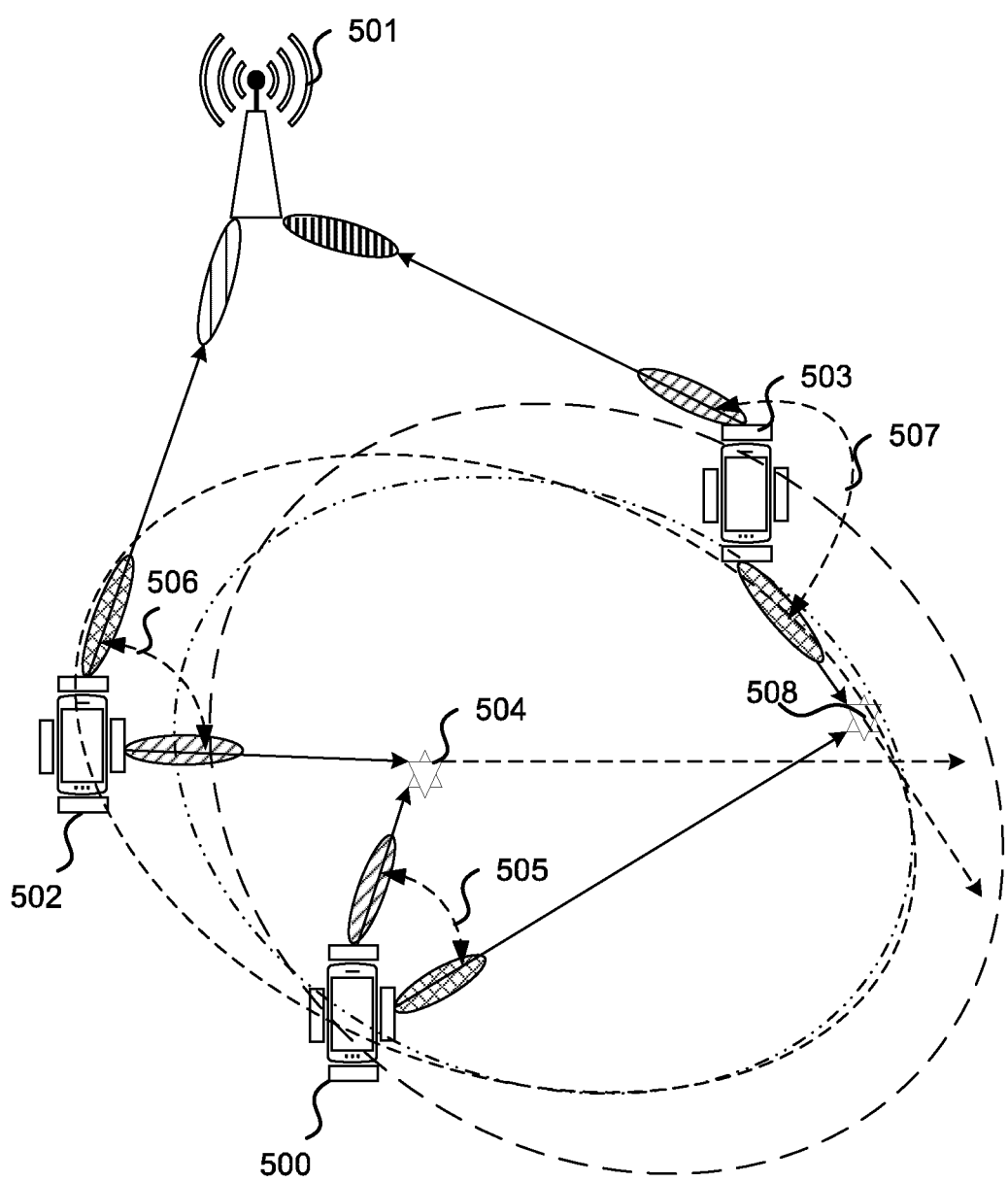
FIG. 5 illustrates an example of a joint use of positioning assistance measurements and time difference measurements for estimating position of a user equipment according to an example embodiment.

FIG. 5 illustrates an example of a joint use of positioning assistance measurements 505, 506, 507 and time difference measurements in a network for estimating position of a target node 500 according to an example embodiment.

The network may comprise a network node 501, a target node 500, such as a UE, and a plurality of anchor nodes 502, 503. Each of the target and anchor nodes may comprise one or more antenna panels configured to receive and transmit radio frequency signals associated with at least one of uplink and downlink transmission resources.

The UE 500 may not be directly reachable by the network node 501. For example, a non-line-of-sight radio channel may be caused by one or more scatterers 504, 508 reflecting the transmission and/or reception beams. The UE 500 may be connected to the network node 501 with two anchor nodes 502, 503 via sidelink or device-to-device connections. The network node 501 and each of the anchor nodes 502, 503 may be connected using a pair of uplink and/or downlink beams. Likewise, the anchor nodes and the target node may be connected using a pair of uplink and/or downlink beams. The network node 501 may have configured positioning assistance measurements, such as AAD measurements for anchor nodes 502, 503 and TAD measurements for target node 500. Furthermore, at least one of the target node 500 or the anchor nodes may be configured to perform time difference measurements related to propagation of signals. The time difference measurements may comprise, for example, time difference of arrival measurements, time of arrival measurements, received signal time difference, or round-trip time measurements between the target node and one or more anchor nodes, or between the anchor node and the network node. Depending on the configured TAD measurement, the target node 500 may measure the angular difference either between at least one of an uplink and/or downlink resources associated with reception and/or transmission beams. After the target node 500 and the one or more anchor nodes 502, 503 have performed the TAD and AAD measurements as well as time difference measurements, one or more of the anchor nodes 502, 503 may provide a positioning report including the AAD measurement results for the network node 501 or the target node 500, for example, via NRLPP (new radio/LTE positioning protocol) or other higher layer signaling or MAC or physical layer signaling. Similarly, the target node 500 may provide a positioning report comprising at least one of the TAD and/or time difference measurement results for the one or more anchor nodes 502, 503 or to the network node 501 via the one or more anchor nodes 502, 503, for example, via NRLPP or other higher layer signaling or MAC or physical layer signaling. Based on the positioning reports, the network node, one or more anchor nodes, or the target node may emulate, by combining the AAD, TAD and time difference measurements, transmitted signal propagation over different channel clusters, reflections or scatterers in the spatial domain associated with the measured beam pair per links. For example, the network node, the anchor node or the target node may reconstruct a geometry of the network based on the positioning reports. As a result of the joint use of the AAD, TAD and time difference measurements, the network node 500 or one or more anchor nodes 502, 503 may estimate accurately the position of the target node 500. The position of the target node 500 may be estimated accurately in the presence of non-line-of-sight radio propagation environment.

Figure 6:
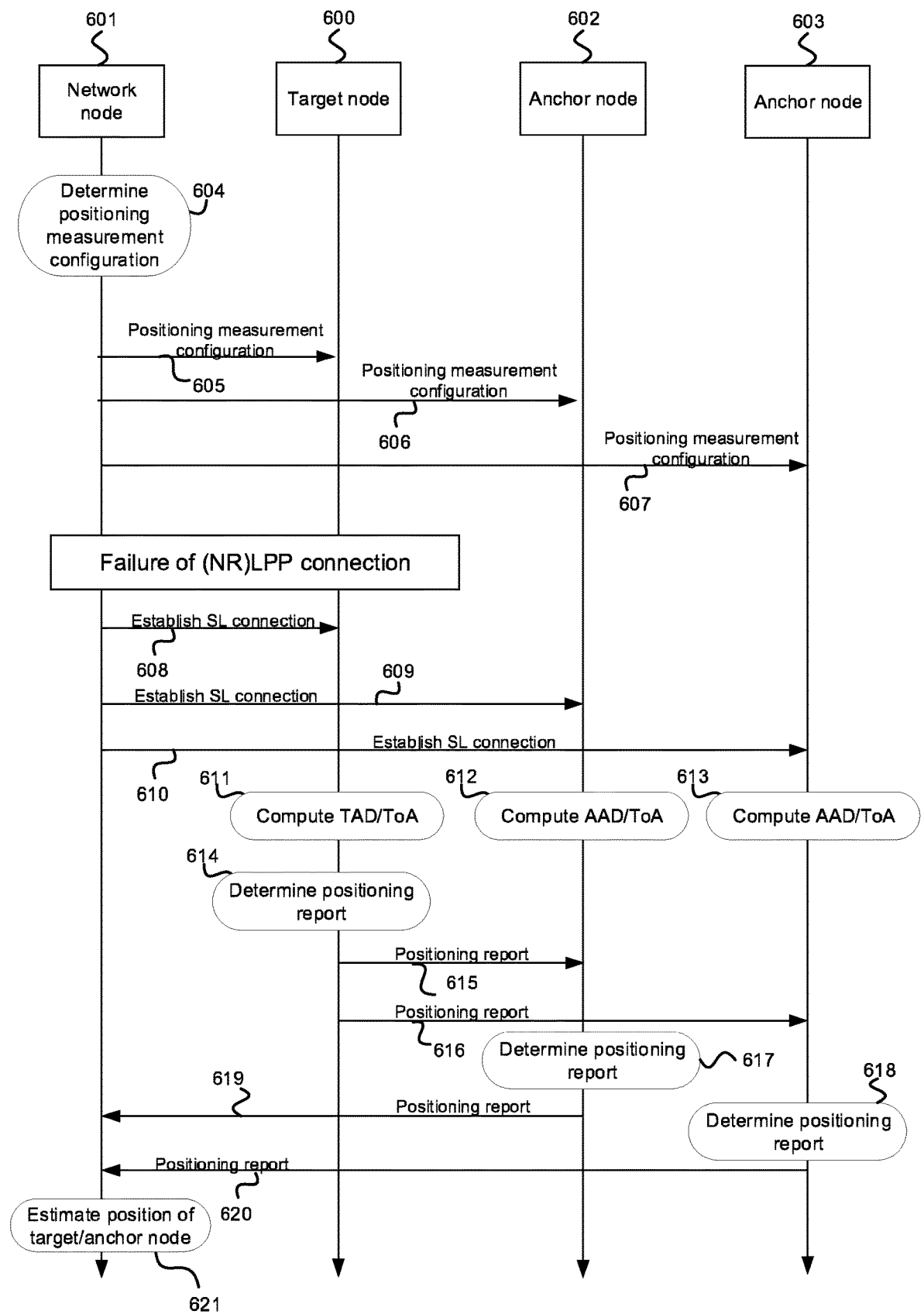
FIG. 6 illustrates an example of a message sequence chart for estimating a position of a user equipment when the position is estimated by a network node according to an example embodiment.

FIG. 6 illustrates an example of a message sequence chart for estimating a position of a user equipment 600 when the position is estimated by a network node 601 according to an example embodiment.

At 604, the network node 601 may be configured to determine a positioning measurement configuration. The network node 601 may determine in the positioning measurement configuration, for example, positioning assistance measurements for the target node 600 and the plurality of anchor nodes 602, 603. In an embodiment, the positioning measurement configuration may comprise at least one of a local or global coordinate system for obtaining the positioning assistance measurements. When global reference coordinates are configured by the network node 601, the network node 601 may configure a global reference direction comprising at least one relative global reference point. The global reference direction may be, for example, a compass north, a set of cartesian points or a set of polar coordinate points with respect to which the target and anchor nodes compute the positioning assistance measurements. The positioning measurement configuration may configure the target node 600 to perform the positioning assistance measurements comprising the TAD measurements in at least one of an azimuth or elevation domain. Similarly, the positioning measurement configuration may configure the anchor nodes 602, 603 to perform the positioning assistance measurements comprising the AAD measurements in at least one of an azimuth or elevation domain.

At operations 605, 606, 607 the network node 601 sends the positioning measurement configuration to the target node 600 and a plurality of the anchor nodes 602, 603. The information sent at 605, 606, 607 may be different for the target node 600 and the anchor nodes 602, 603. For example, for target node 600 the positioning measurement configuration may comprise an indication of a TAD measurement. For anchor nodes 602, 603 the positioning measurement configuration may comprise an indication of an AAD measurement.

Alternatively, the same information including indications of both AAD and TAD measurements may be sent to target node 600 and anchor nodes 602, 603. The measurement to be performed may be determined based on a type of the node. For example, since target node 600 has sidelink connections to anchor nodes 602, 603, the target node may determine to perform a TAD measurement. The positioning measurements may be preconfigured, as illustrated in FIG. 6. Alternatively, or in addition, the positioning measurements may be configured after a failure in connection between the target node 600 and the network node 601. The failure in connection may be caused, for example, when the target node 600 enters an area without a network coverage. When the (NR)LPP connection has failed, the target node 600 may still be able to obtain the positioning assistance measurements according to the previously received positioning measurement configuration, but may not be able to report the positioning assistance measurements to the network node.

At 608, 609, and 610, the network node 601 may establish or trigger sidelink (SL) connections between the target node 600 and at least two anchor nodes 602, 603, for example in response to the connection failure, for example in LPP connection or a corresponding positioning protocol, such as NRLPP. In an embodiment, the at least two anchor network nodes 602, 603 may establish the SL connections between the target node 600 and the anchor nodes 602, 603. The plurality of SL connections to a target node via the plurality of anchor nodes may enable seamless positioning service of the target node 600 when the target node 600 is not directly reachable by the network node 601. Hence, the (NR)LPP connection may be re-established via the SL connections. The SL connection may be established with a pair of uplink and/or downlink beams between the anchor nodes 602, 603 and the target node 600. The network node 601 and each of the anchor nodes 602, 603 may be connected using a pair of uplink and/or downlink beams.

At operation 611, the target node may compute at least one positioning assistance measurement comprising a target node based angular difference (TAD) between the pair of uplink and/or downlink beam directions based on the positioning measurement configuration. The target node may further compute at least one time difference measurement related to propagation of signals between the target node and/or at least one anchor node. The one or more time difference measurements may comprise, for example, time of arrival, time difference of arrival, round trip time or reference signal difference measurements between the target node 600 and at least one anchor node 602, 603.

The one or more positioning assistance measurements may be computed in at least one of a local or a global coordinate system based on the positioning measurement configuration. In an embodiment, the positioning assistance measurements may be determined in a global coordinate system with respect to at least one relative global coordinate reference point comprising at least one of a compass north, a cartesian coordinate point or a polar coordinate point. In an embodiment, the at least one global coordinate reference point comprises combinations of the compass north, one or more cartesian coordinate points or one or more polar coordinate points associated with a single or multiple reference transmission reception point(s). In an embodiment, the positioning assistance measurements may be computed in at least one of an azimuth domain or an elevation domain based on the positioning measurement configuration.

In the local coordinate system, the positioning assistance measurements may comprise an angular difference between a reception or a transmission beam angle of a downlink or an uplink transmission resource from/to one anchor node 602, 603 and a reception or a transmission beam angle of an uplink or a downlink transmission resource from/to another anchor node 602, 603. The target node 600 may compute a difference of the transmission and/or reception beam angles and take an absolute value of the result. In an embodiment, the target node 600 may compute a reception beam angle associated with a downlink transmission resource from the anchor node 602 and a reception beam angle associated with an uplink transmission resource from the anchor node 603. In an embodiment, the target node 600 may compute the angular difference between a reception beam angle associated with a downlink transmission resource from the anchor node 602 and a transmission beam angle associated with an uplink transmission resource to the anchor node 603. In an embodiment, the target node 600 may compute the angular difference between a transmission beam angle associated with an uplink transmission resource to the anchor node 602 and a transmission beam angle associated with an uplink transmission resource to the anchor node 603. In an embodiment, the target node 600 may compute the angular difference between a transmission beam angle associated with an uplink transmission resource to the anchor node 602 and a reception beam angle associated with an uplink transmission resource from the anchor node 603. In an embodiment, the target node 600 may compute the angular difference between a reception beam angle associated with a downlink transmission resource from the anchor node 602 and a reception beam angle associated with a downlink transmission resource from the network node 603. In an embodiment, the angular differences of the beam angles comprise an antenna panel orientation of the target node 600. The above positioning assistance measurements i.e. angle difference between DL and/or UL resources associated with reception or/and transmission beams are also valid for computation between any network nodes, e.g. anchor nodes, sidelink nodes, gNBs, Transmission-Reception Points (TRP)s, which may be a set of geographically co-located antennas (e.g. antenna array (with one or more antenna elements)) supporting TP and/or RP functionality, or a combination thereof.

In the global coordinate system, the positioning assistance measurements may comprise a target node based angular difference (TAD) between one of a reception or a transmission beam angle associated with a downlink or uplink transmission resource from/to one anchor node with respect to at least one configured global coordinate reference point and a reception or a transmission beam angle associated with an uplink or a downlink transmission resource from/to another anchor node with respect to the at least one configured global coordinate reference point. In an embodiment, the target node 600 may compute a relative TAD measurement between a reception beam angle associated with a downlink transmission resource from the anchor node 602 with respect to the configured global reference point(s). In addition, the target node 600 may compute the relative TAD measurement between a reception beam angle associated with an uplink transmission resource from the anchor node 603 with respect to the configured global reference point(s). In an embodiment, the target node 600 may compute the relative TAD measurement between a transmission beam angle associated with a uplink transmission resource to the anchor network node 602 with respect to the configured global reference point(s). In addition, the target node 600 may compute the relative TAD measurement between a reception beam angle associated with an downlink transmission resource from the anchor node 603 with respect to the configured global reference point(s). In an embodiment, the angular differences of the beam angles may comprise an antenna panel orientation of the target node 600. The above positioning assistance measurements i.e. angle difference between DL and/or UL resources associated with reception or/and transmission beams are with respect to global coordination point(s) also valid for computation between any network nodes, e.g. anchor nodes, sidelink nodes, gNBs, TRPs, or a combination thereof.

In an embodiment, the different relative angle difference measurements between the pair of reception and/or transmission beam of the uplink and/or downlink resources may be ordered for each configured global reference point associated with a network node separately under node measurement configuration by the network. For example, the network may configure a specific measurement order in time, e.g. firstly an angle difference between a downlink resource from a network node associated with a reception beam angle and a downlink resource from another network node associated with the reception beam angle, secondly an angle difference between a downlink resource from a network node associated with a reception beam angle and an uplink resource to another network node associated with the transmission beam angle. For each configured reference point, relative angle information in global coordinate system may be computed based on a difference between the transmission and/or reception beam of the uplink and/or downlink resources. In addition, an absolute value may be taken from the computed difference value.

In an embodiment, the network node 601 may configure the positioning assistance measurements to be periodic or semi-persistent or aperiodic at the target node 600. Alternatively, the positioning report comprising the one or more positioning assistance measurements may be dynamically requested by the network node 601 based on a required positioning accuracy. For example, the target node 600 may not need to report the positioning assistance measurements, or the positioning assistance measurements may not need to be conveyed to network node 601, e.g. if a positioning service does not require accurate position or the potential positioning error may be tolerated.

At operations 612 and 613, at least one positioning assistance measurement comprising an anchor node based angular difference (AAD) between the pair of uplink and/or downlink beam directions may be computed based on the positioning measurement configuration by each respective anchor node 602, 603. The AAD measurements may be computed by the anchor nodes 602, 603 based on a local and/or global coordinate system configured by the network node 601. In an embodiment, the positioning assistance measurements of the anchor nodes 602, 603 may be determined in a global coordinate system with respect to at least one relative global coordinate reference point comprising at least one of a compass north, a cartesian coordinate point or a polar coordinate point. In an embodiment, the positioning assistance measurements of the anchor nodes 602, 603 may be computed in at least one of an azimuth domain or an elevation domain based on the positioning measurement configuration.

In the local coordinate system, the positioning assistance measurements of the anchor nodes 602, 603 may comprise an angular difference between a reception or a transmission beam angle of a downlink or an uplink transmission resource from/to the network node 601 and a reception or a transmission beam angle of an uplink or a downlink transmission resource from/to the target node 600. The anchor node 602, 603 may compute a difference of the transmission and/or reception beam angles and take an absolute value of the result. In an embodiment, the anchor node 602, 603 may compute a reception beam angle associated with a downlink transmission resource from the network node 601 and a reception beam angle associated with an uplink transmission resource from the target node 600. In an embodiment, the anchor node 602, 603 may compute the angular difference between a reception beam angle associated with a downlink transmission resource from the network node 601 and a transmission beam angle associated with an uplink transmission resource to the target node 600. In an embodiment, the anchor node 602, 603 may compute the angular difference between a transmission beam angle associated with an uplink transmission resource to the network node 601 and a transmission beam angle associated with an uplink transmission resource to the target node 600. In an embodiment, the anchor node 602, 603 may compute the angular difference between a transmission beam angle associated with an uplink transmission resource to the network node 601 and a reception beam angle associated with an uplink transmission resource from the target node 600. In an embodiment, the angular differences of the beam angles comprise an antenna panel orientation of the respective anchor node 602, 603.

In global coordinate system, the positioning assistance measurements may comprise an anchor node based angular difference (AAD) between a reception or a transmission beam angle associated with a downlink or uplink transmission resource from/to the network node 601 with respect to at least one configured global coordinate reference point and a reception or a transmission beam angle associated with an uplink or a downlink transmission resource from/to the target node 600 with respect to the at least one configured global coordinate reference point. In an embodiment, the anchor node 602, 603 may compute a relative AAD measurement between a reception beam angle associated with a downlink transmission resource from the network node 601 with respect to the configured global reference point(s). In addition, the anchor node 602, 603 may compute the relative AAD measurement between a reception beam angle associated with an uplink transmission resource from the network node 601 with respect to the configured global reference point(s). In an embodiment, the anchor node 602, 603 may compute the relative AAD measurement between a transmission beam angle associated with a uplink transmission resource to the network node 601 with respect to the configured global reference point(s). In addition, the anchor node 602, 603 may compute the relative AAD measurement between a reception beam angle associated with a downlink transmission resource from the network node 601 with respect to the configured global reference point(s). In an embodiment, the angular differences of the beam angles may comprise an antenna panel orientation of the respective anchor node 602, 603.

In an embodiment, the different relative angle difference measurements between the pair of reception and/or transmission beam of the uplink and/or downlink resources may be ordered for each configured global reference point associated with a network node separately under node measurement configuration by the network. For example, the network may configure a specific measurement order in time, e.g. firstly an angle difference between a downlink resource from a network node associated with a reception beam angle and a downlink resource from another network node associated with the reception beam angle, secondly an angle difference between a downlink resource from a network node associated with a reception beam angle and an uplink resource to another network node associated with the transmission beam angle. For each configured reference point, relative angle information in global coordinate system may be computed based on a difference between the transmission and/or reception beam of the uplink and/or downlink resources. In addition, an absolute value may be taken from the computed difference value.

In an embodiment, the downlink resources defined in the above AAD or TAD positioning assistance measurements may be associated with at least one of reference signals, data or control. The positioning assistance measurements may be associated, for example, with a non-zero-power channel state information reference signal (NZP-CSI-RS) for beam management (BM), time-frequency tracking, a channel state information (CSI) acquisition, a positioning reference signal (PRS), a phase tracking reference signal (PTRS), a demodulation reference signal (DMRS) of physical downlink shared channel (PDSCH), a DMRS of physical downlink control channel (PDCCH) or a synchronization signal block (SSB).

In an embodiment, the uplink resources defined in the above AAD or TAD positioning assistance measurements may be associated with at least one of reference signals, data or control. For example, the positioning assistance measurements may be associated with a sounding reference signal (SRS), uplink positioning reference signal (PRS), a phase tracking reference signal (PTRS), a DMRS of physical uplink shared channel (PUSCH) or a DMRS of physical uplink control channel (PUCCH).

At operation 614, the target node may determine a positioning report. The positioning report may comprise at least one positioning assistance measurement. In an embodiment, the positioning report may comprise one or more time difference measurement(s), round-trip-time measurements, carrier phase measurements for positioning, angle of arrival measurements, angle of departure measurements, and/or reference signal received power measurements.

At operations 615 and 616, the target node may dispatch the positioning report to one or more anchor nodes 602, 603. At operations 617 and 618, in response to receiving the positioning report from the target node 600, the one or more anchor nodes 602, 603 may determine a positioning report comprising one or more positioning assistance measurement(s) of the respective anchor node 602, 603 and the measurement results of the positioning report of the target node 600. In an embodiment, the positioning report may further comprise one or more time difference measurement(s), round-trip-time measurements, carrier phase measurements, angle of arrival measurements, angle of departure measurements, and/or reference signal received power of the respective anchor node 602, 603. If one anchor node does not receive the positioning report of the target node 600, the measurement results of the target node may be omitted from the positioning report of the respective anchor node. At operations 619 and 620 the one or more anchor nodes 602, 603 may dispatch the positioning report of the respective anchor node 602, 603 to the network node 601.

At operation 621, in response to receiving the position report(s) from the one or more anchor nodes 602, 603, the network node 601 may estimate the position of the target node 600. For example, the network node may reconstruct a geometry of the network comprising the network node, the target node and the plurality of anchor nodes based on the positioning assistance measurements and the time difference measurements and/or round-trip-time measurements and/or carrier phase measurements for positioning and/or angle of arrival measurements and/or angle of departure measurements and/or reference signal received power measurements of at least one of the target node or the anchor nodes to determine position of at least one of the target node or one of the plurality of anchor nodes.

Figure 7:
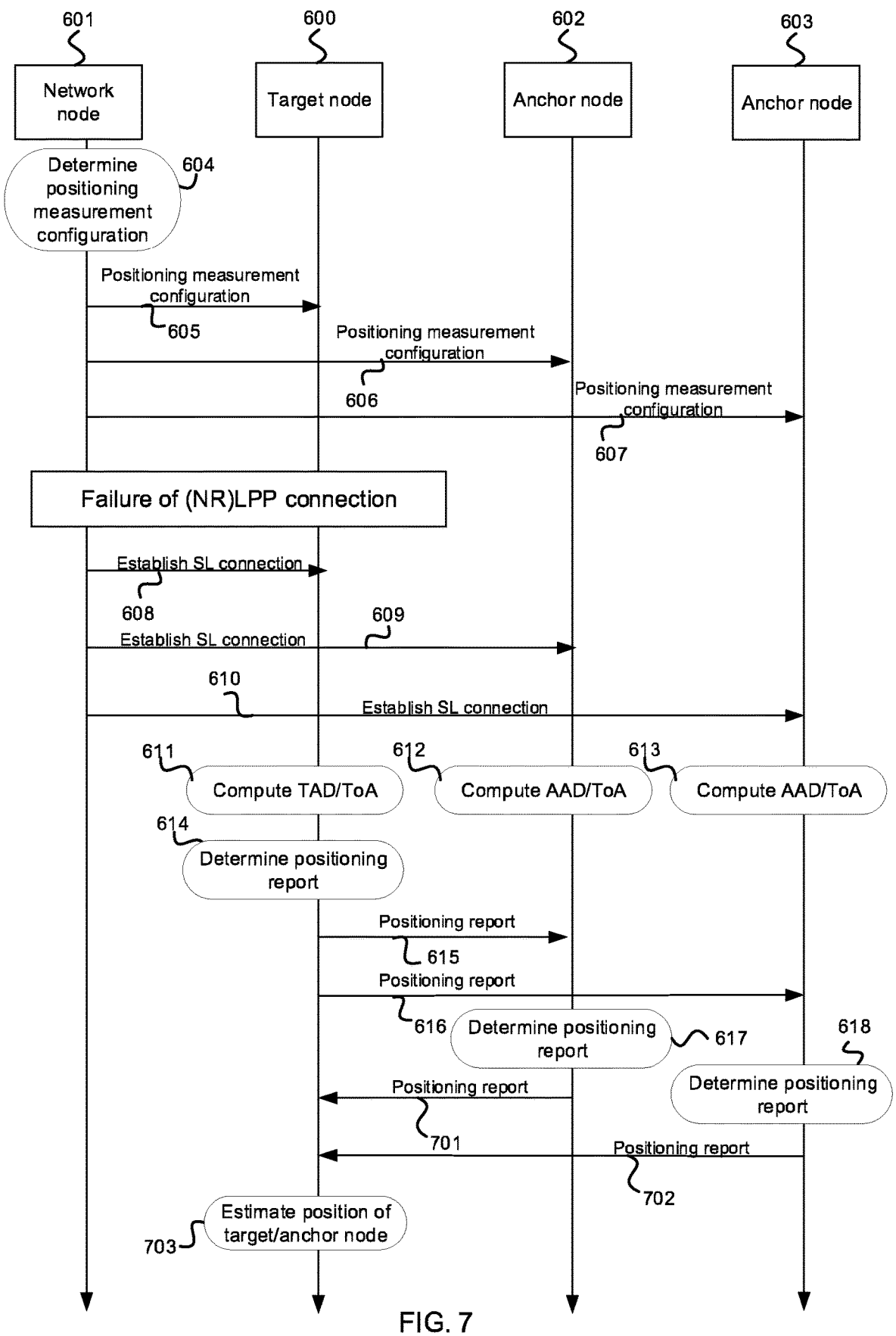
FIG. 7 illustrates an example of a message sequence chart for estimating a position of a user equipment when the position is estimated by an anchor node according to an example embodiment.

FIG. 7 illustrates an example of a message sequence chart for estimating a position of a user equipment when the position is estimated by a target node according to an example embodiment. In FIG. 7, operations 604 to 618 correspond to operations of the like references in FIG. 6.

At operations 701 and 702, the one or more anchor nodes 602, 603 may dispatch their positioning reports to the target node 600. In response, at operation 703, the target node 600 may estimate its own position based on the measurement results of the positioning reports. For example, the target node 600 may reconstruct a geometry of the network comprising the network node 601, the target node 600 and the plurality of anchor nodes 602, 603 based on the positioning assistance measurements and the time difference measurements of at least one of the target node or the anchor nodes. In an embodiment, the target node 600 may estimate position of at least one anchor node 602, 603 based on the positioning reports.

Figure 8:
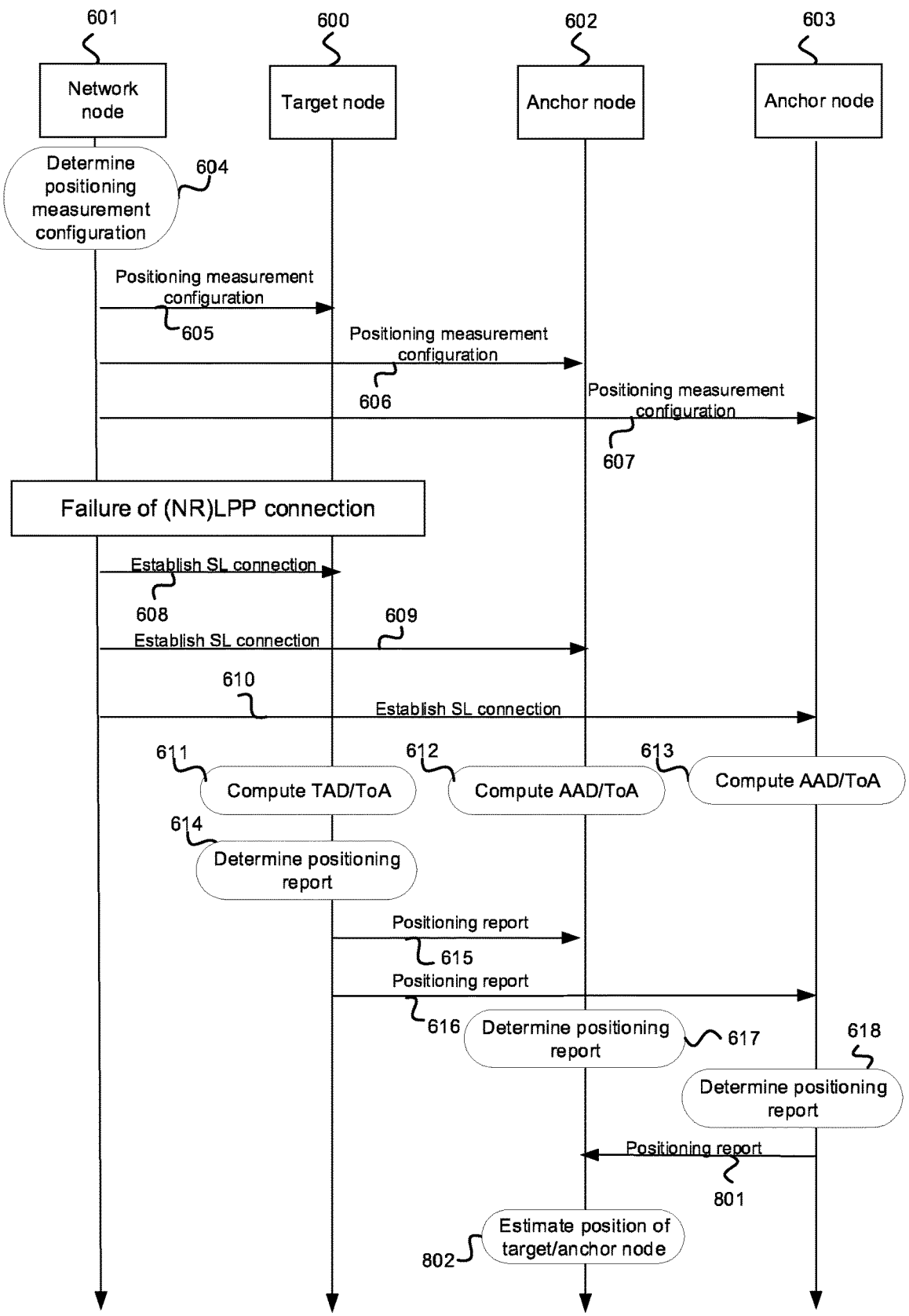
FIG. 8 illustrates an example of a message sequence chart for estimating a position of a user equipment when the position is estimated by a target node according to an example embodiment.

FIG. 8 illustrates an example of a message sequence chart for estimating a position of a user equipment when the position is estimated by an anchor node according to an example embodiment. In FIG. 8, operations 604 to 618 correspond to operations of the like references in FIG. 6 and FIG. 7.

At operation 801, one anchor node 603 may dispatch its positioning report to another anchor node 602. In response to receiving the positioning reports from the target node 600 and the anchor node 603, at operation 802, the anchor node 602 may estimate position of at least one of the target node 600 or the anchor node 603 based on the positioning assistance measurements and the time difference measurements and/or carrier phase measurements and/or round-trip-time measurements and/or angle of arrival measurements and/or angle of departure measurements, and/or reference signal received power measurements as described above. In an embodiment, the anchor node 602 may receive the positioning report only from the target node 600 and estimate the position of the target node 600 based on the TAD measurement from the target node 600 and the AAD of the anchor node 602.

Thus, based on the positioning reports comprising the AAD, TAD and/or time difference measurements and/or round-trip-time measurements and/or carrier phase measurements for positioning and/or angle of arrival measurements and/or angle of departure measurements, and/or reference signal received power, both UEs and/or network node may be able to accurately localize at least one of the target node or the anchor node.

Figure 9:
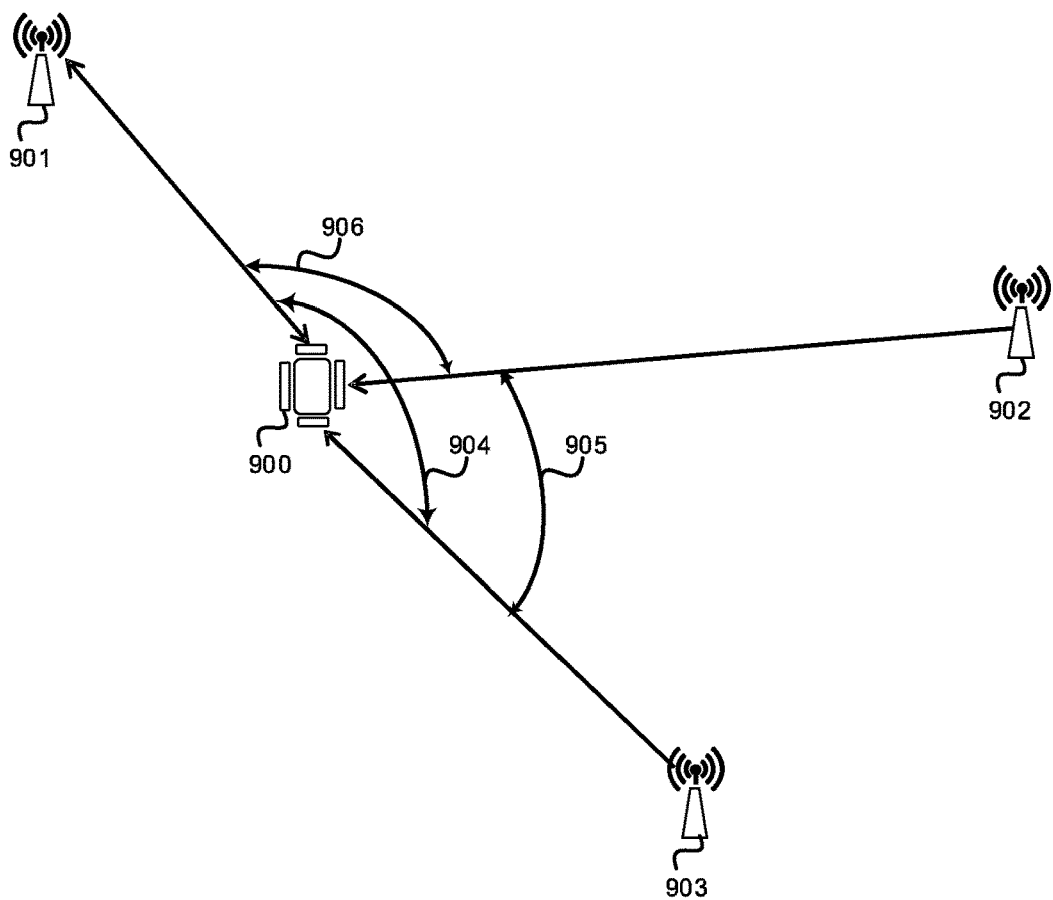
FIG. 9 illustrates an example of localizing a user equipment based on angular difference measurements of network nodes connected with the user equipment according to an example embodiment.

FIG. 9 illustrates an example of localizing a user equipment based on angular difference measurements of network nodes 901, 902, 903 connected with the user equipment according to an example embodiment.

A target node 900, such as the UE, may be connected to a plurality of network nodes 901, 902, 903, such as gNBs and/or TRPs. The target node 900 may compute angle of arrival differences 905, 906 for example, between each network node 901, 902, 903 from which downlink transmission is received at the target node 900. The target node 900 may report the angle of arrival differences 904, 905, 906 between the downlink transmission measurements to one network node 901. Additionally, the target node 900 may dispatch at least one of one or more time difference measurements, time of arrival measurements, carrier phase measurements, round-trip-time measurements, angle of departure measurements associated with a downlink transmission from one or more network nodes or uplink transmission from the target node, angle of arrival measurements associated to uplink transmission from one or more network nodes and/or carrier phase measurements. The network node 901 may combine each measurements received from the target node 900 for estimating position of the target node 900.

In an embodiment, the target node 900 may be configured to compute angle of differences between different downlink and/or uplink transmission reception and/or transmission beam pairs, for example, associated with one or more network nodes 901, 902, 903. The network may configure a specific downlink or uplink TX-RX beam pair as reference with respect to which the angle difference is computed by the target node 900. Moreover, the network may also dynamically indicate which of the downlink and/or uplink TX-RX beam pairs associated with other network nodes 901, 902, 903 shall be computed at the target node 900 for position information reporting. The target node 900 may dispatch the configured angle difference measurement results for the network.

In an embodiment, the target node 900 may determine autonomously which of angle of differences between different downlink and/or uplink transmission reception and/or transmission beam pairs may be computed, for example, associated with one or more network nodes 901, 902, 903. Alternatively, or additionally, the target node 900 may indicate dynamically which of the downlink/uplink TX-RX beam pairs associated with other network nodes 901, 902, 903 is used as reference downlink/uplink TX-RX beam pair for angle difference computation and reporting between different the network nodes 901, 902, 903. The target node 900 may dispatch the autonomously computed angle difference measurement results for the network.

In an embodiment, the reference indication may be dispatched to or determined by anchor nodes. In addition, or alternatively, the anchor nodes may determine autonomously which of angle of differences between different downlink and/or uplink transmission reception and/or transmission beam pairs may be computed, or the downlink and/or uplink transmission reception and/or transmission beam pairs for computation may be configured by a network node.

Figure 10:
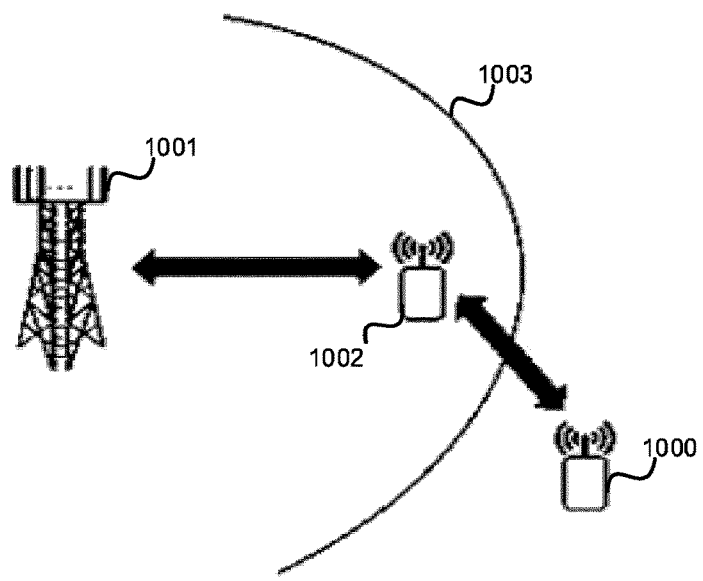
FIG. 10 illustrates an example of a beam-domain procedure to localize a user equipment when the user equipment is out of coverage of a network node according to an example embodiment.
Figure 11:
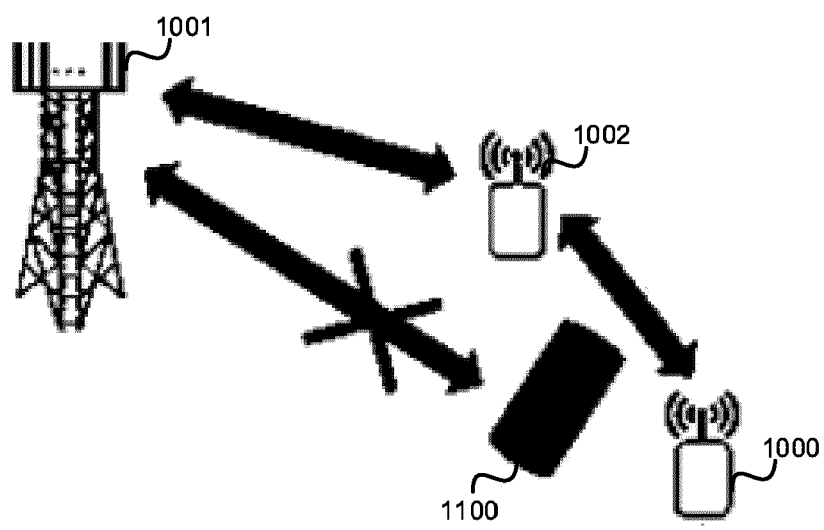
FIG. 11 illustrates an example of a beam-domain procedure to localize a user equipment when the user equipment is out of coverage of a network node according to another example embodiment.

FIGS. 10 and 11 illustrate examples of a beam-domain procedure to localize a user equipment when the user equipment is out of coverage of a network node 1001 according to example embodiments. A target node 1000, such the UE, may be unreachable by the network node 1001, for example, due to an out-of-coverage situation caused by a free-space path loss as illustrated in FIG. 10 with a cell edge 1003. The out-of-coverage situation may be also caused, for example, due to a blockage 1100 between the target node 1000 and the network node 1001, as illustrated in FIG. 11. In an embodiment, the localization procedure may be triggered by the network node 1001 when the network node 1001 requests one or more in-coverage nodes 1002 to report information about other nodes already connected, for example, through D2D links, or about other out-of-coverage nodes that may have been discovered. The reported information may comprise, for example, the international mobile subscriber identity (IMSI).

Upon reception of the request, the in-coverage node 1002 may provide the network node 1001 with the requested information (e.g., the IMSI) about the other nodes already connected through D2D links or about the other out-of-coverage nodes that have been discovered by the node 1002. Subsequently, the network node 1001 may enable one or more in-coverage nodes 1002 that are connected with the target node 1000 to act as anchor nodes and assist the network in localizing the target node 1000. The network node 1001 may configure, and/or activate if already configured, time-frequency resources for the target node 1000 to transmit, for example, SRS for positioning (i.e., PRS) in the uplink to the anchor node(s) 1002 and for the anchor node(s) 1002 to receive such SRS. Based on the received configuration, the target node 1000 may schedule sidelink control channel resources for the one or more anchor nodes 1002, on which it transmits the SRS for positioning. The one or more anchor nodes 1002 may obtain positioning assistance measurements, such as angle and time measurements associated with at least one of the network node 1001 and the target node 1000, e.g., angle of arrival (AoA), angle of departure (AoD), and time of flight (ToF), from the received sidelink control signaling described above. The one or more anchor nodes 1002 may forward the obtained positioning assistance measurements to the network node 1001. The network, such as the network node 1001 or a location server may use the positioning assistance measurements provided by the one or more anchor nodes 1002 to estimate the position of the target node 1000.

Figure 12:
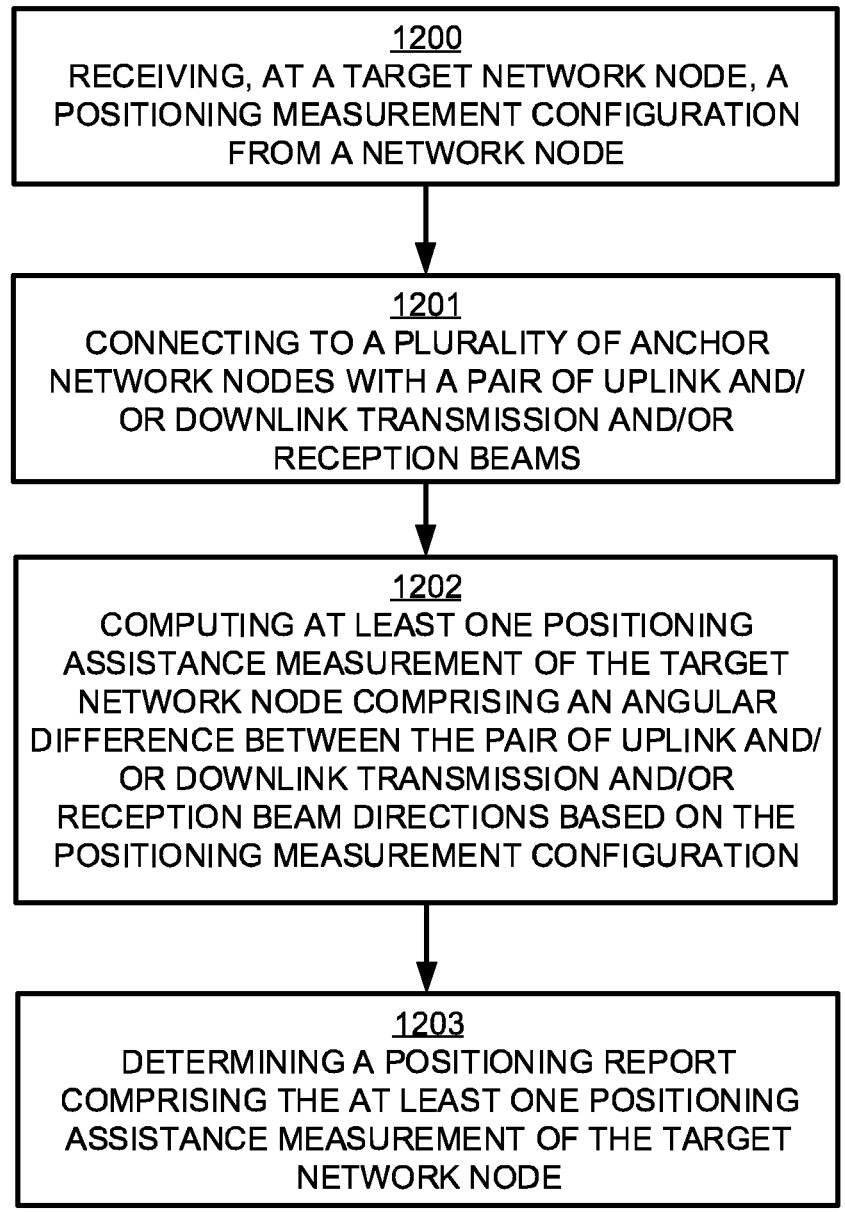
FIG. 12 illustrates a method for estimating a position of a user equipment when the position is estimated by a network node according to an example embodiment.

FIG. 12 illustrates a method for estimating a position of a user equipment when the position is estimated by a network node according to an example embodiment.

At 1200, the method may comprise receiving, at a target network node, a positioning measurement configuration from a network node.

At 1201, the method may comprise connecting to a plurality of anchor network nodes with a pair of uplink and/or downlink transmission and/or reception beams.

At 1202, the method may comprise computing at least one positioning assistance measurement of the target network node comprising an angular difference between the pair of uplink and/or downlink transmission and/or reception beam directions based on the positioning measurement configuration.

At 1203, the method may comprise determining a positioning report comprising the at least one positioning assistance measurement of the target network node.

Figure 13:
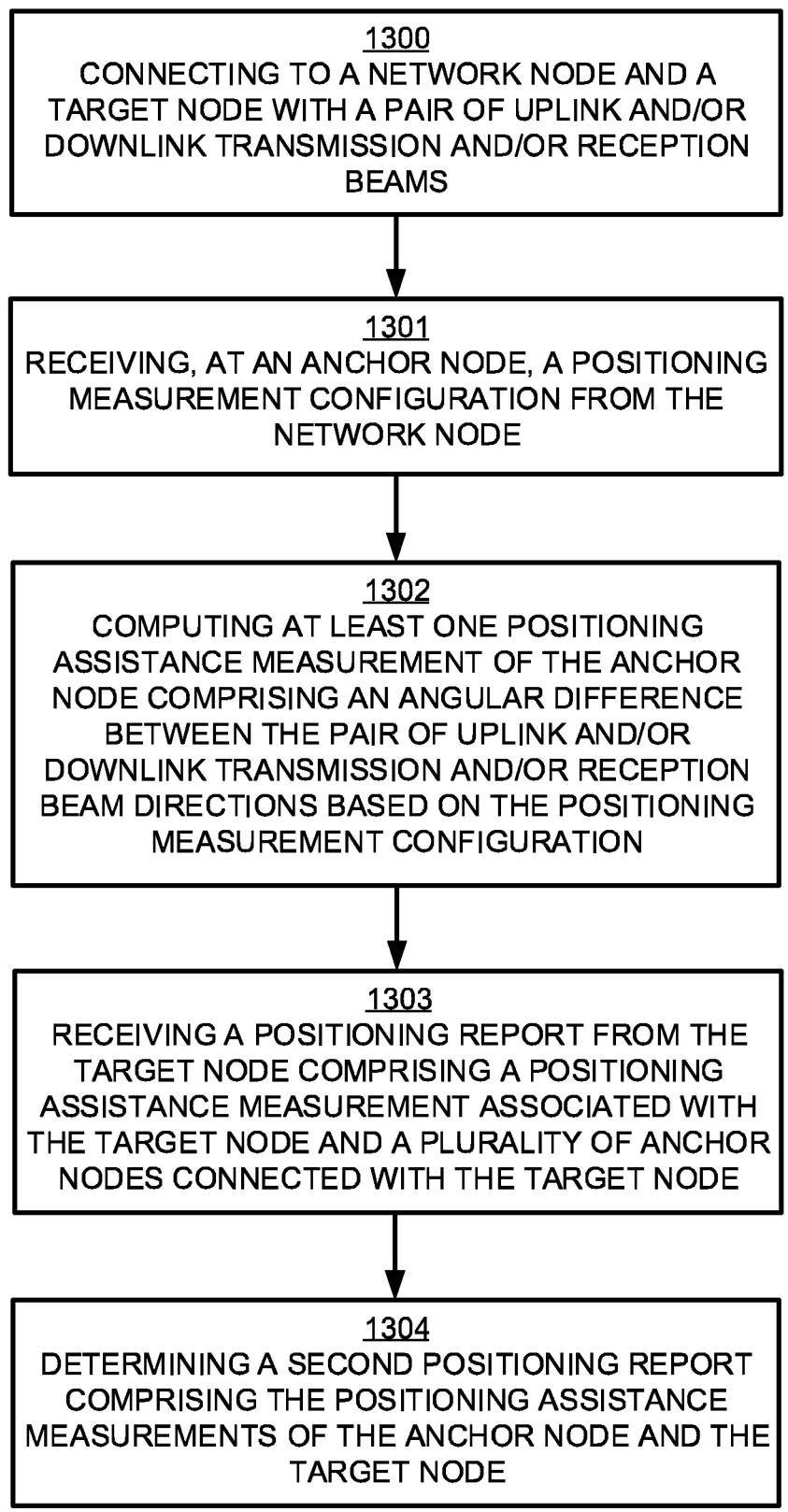
FIG. 13 illustrates a method for estimating a position of a user equipment when the position is estimated by an anchor node according to an example embodiment.

FIG. 13 illustrates a method for estimating a position of a user equipment when the position is estimated by an anchor node according to an example embodiment.

At 1300, the method may comprise connecting to a network node and a target node with a pair of uplink and/or downlink transmission and/or reception beams.

At 1301, the method may comprise receiving, at an anchor node, a positioning measurement configuration from the network node.

At 1302, the method may comprise computing at least one positioning assistance measurement of the anchor node comprising an angular difference between the pair of uplink and/or downlink transmission and/or reception beam directions based on the positioning measurement configuration.

At 1303, the method may comprise receiving a positioning report from the target node comprising a positioning assistance measurement associated with the target node and a plurality of anchor nodes connected with the target node.

At 1304, the method may comprise determining a second positioning report comprising the positioning assistance measurements of the anchor node and the target node.

Figure 14:
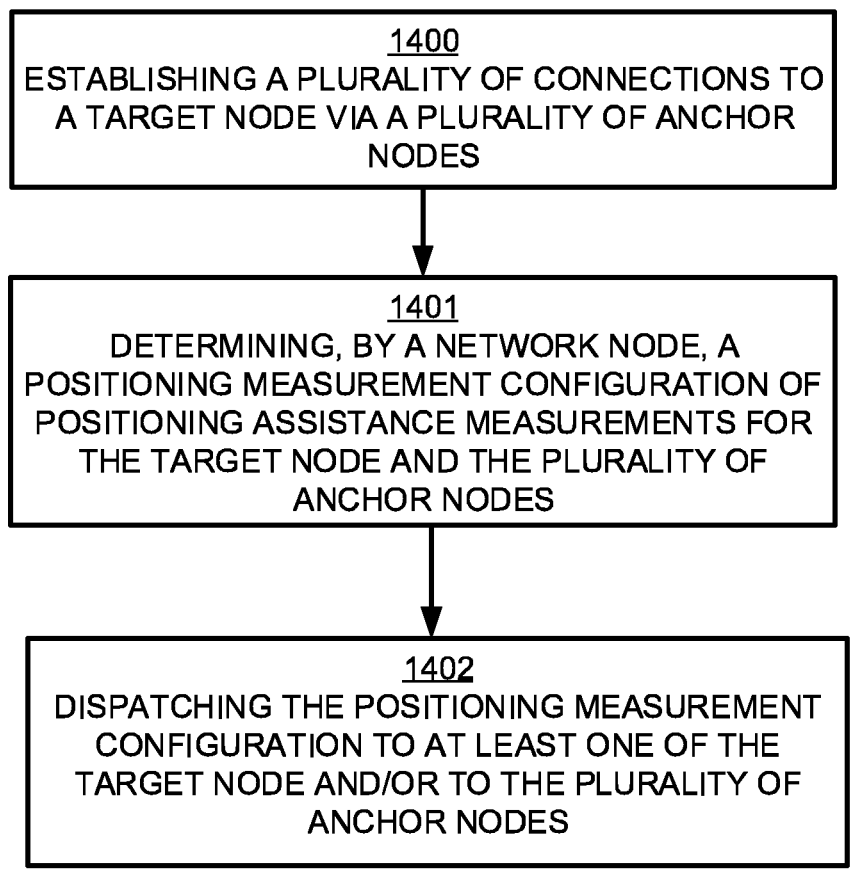
FIG. 14 illustrates a method for estimating a position of a user equipment when the position is estimated by a target node according to an example embodiment.

FIG. 14 illustrates a method for estimating a position of a user equipment when the position is estimated by a target node according to an example embodiment.

At 1400, the method may comprise establishing a plurality of connections to a target node via a plurality of anchor nodes.

At 1401, the method may comprise determining, by a network node, a positioning measurement configuration of positioning assistance measurements for the target node and the plurality of anchor nodes.

At 1402, the method may comprise dispatching the positioning measurement configuration to at least one of the target node and/or to the plurality of anchor nodes.

Further features of the methods directly result from the functionalities and parameters of the apparatuses, as described in the appended claims and throughout the specification and are therefore not repeated here. It is noted that one or more operations of the method may be performed in different order.

An apparatus, for example a network node, a target node or an anchor node, may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at one memory and the program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
at least one processor; and
at least one memory including computer program code;
the at least one memory and the computer code configured to, with the at least one processor, cause the apparatus at least to:
  receive, at a target node, a positioning measurement configuration from a network node;
  connect to a plurality of anchor nodes with a pair of uplink transmission and/or downlink reception beams, wherein the uplink transmission and/or downlink reception beam angles comprise an antenna panel orientation of the target node;
compute at least one positioning assistance measurement of the target node comprising an angular difference between the pair of uplink transmission and/or downlink reception beam directions based on the positioning measurement configuration,
  wherein the at least one positioning assistance measurement is determined in a global coordinate system with respect to at least one relative global coordinate reference point comprising a cartesian coordinate point or a polar coordinate point,
  wherein the at least one positioning assistance measurement is determined in an azimuth domain and an elevation domain,
  wherein the at least one positioning assistance measurement comprises an angular difference between an uplink transmission or downlink reception beam angle to/from one anchor node and resource an uplink transmission or downlink reception beam angle to/from another anchor node in a local coordinate system, and
  wherein the apparatus is configured to determine which pair of uplink transmission and/or downlink reception beams associated with the plurality of anchor nodes is used for computing the at least one positioning assistance measurement;
determine a positioning report comprising the at least one positioning assistance measurement of the target node;

compute one or more of each of time difference measurements, round-trip-time measurements, carrier phase measurements for positioning, angle of arrival measurements, angle of departure measurements and reference signal received power measurements related to propagation of signals between the target node and at least one anchor node,
   wherein the positioning report comprises the one or more of each of time difference measurements, round-trip-time, carrier phase measurements for positioning, angle of arrival measurements, angle of departure measurements and reference signal received power measurements, and
   wherein the one or more of each of time difference measurements comprise a time of arrival measurement, a time difference of arrival measurement, round trip time and a reference signal time difference measurement;
dispatch the positioning report to at least one of the plurality of anchor nodes;
receive, from at least one of the plurality of anchor nodes, at least one second positioning report comprising the at least one positioning assistance measurement and the one or more of each of time difference measurements, round-trip-time measurements, carrier phase measurements for positioning, angle of arrival measurements, angle of departure measurements and reference signal received power measurements of the anchor node; and
reconstruct a geometry of a network comprising the network node, the target node and at least one anchor node based on the positioning reports of the target node and the at least one anchor node to determine position of the target node and one of the plurality of anchor nodes.

* * * * *